United States Patent [19]

Kerkman et al.

[11] Patent Number: 5,581,169
[45] Date of Patent: Dec. 3, 1996

[54] APPARATUS USED WITH AN INVERTER/CONVERTER ELIMINATING UNINTENDED VOLTAGE PULSES

[75] Inventors: Russel J. Kerkman, Milwaukee; David Schlegel, Saukville; Calvin C. Steinweg, Hartford, all of Wis.

[73] Assignee: Allen-Bradley Company, Inc., Milwaukee, Wis.

[21] Appl. No.: 298,624

[22] Filed: Aug. 31, 1994

[51] Int. Cl.$^6$ ....................................................... H02P 5/40
[52] U.S. Cl. ............. 318/811; 318/798; 318/806; 318/254; 318/138
[58] Field of Search ........................... 318/138, 254, 318/618, 800–833, 603, 439

[56] References Cited

U.S. PATENT DOCUMENTS

| | | | |
|---|---|---|---|
| 3,757,100 | 9/1973 | Coleman | 318/593 |
| 4,047,083 | 9/1977 | Plunkett | 318/231 |
| 4,099,109 | 7/1978 | Abbondant | 318/227 |
| 4,516,178 | 5/1985 | Lee | 318/616 |
| 4,547,719 | 10/1985 | Sakamoto et al. | 318/723 |
| 4,823,056 | 4/1989 | Watanabe et al. | 318/599 |
| 4,953,069 | 8/1990 | Braun et al. | 318/801 |
| 4,994,950 | 2/1991 | Gritter | 318/811 |
| 4,998,053 | 3/1991 | Hamann et al. | 318/723 |
| 4,999,558 | 3/1991 | Onodera et al. | 318/685 |
| 5,017,845 | 5/1991 | Carobolante et al. | 318/138 |
| 5,023,527 | 6/1991 | Erdman et al. | 318/254 |
| 5,172,036 | 12/1992 | Cameron | 318/138 |
| 5,221,881 | 6/1993 | Cameron | 318/256 |
| 5,294,877 | 3/1994 | Cameron | 318/809 |
| 5,306,988 | 4/1994 | Carobolante et al. | 318/254 |
| 5,317,243 | 5/1994 | Cameron | 318/254 |
| 5,350,988 | 9/1994 | Le | 318/618 |

*Primary Examiner*—Paul Ip
*Attorney, Agent, or Firm*—Michael A. Jaskolski; John M. Miller; John J. Horn

[57] ABSTRACT

A method and apparatus used with a motor controller having a PWM inverter for eliminating discontinuities in a stator current that are caused by noise, command signal discontinuities and feedback corrections. While noise, discontinuities, and correction can cause multiple crossings between a carrier signal and a command signal during a half cycle of a carrier signal, the present invention only allows a single crossing during any carrier signal half cycle to effect motor operation.

14 Claims, 6 Drawing Sheets

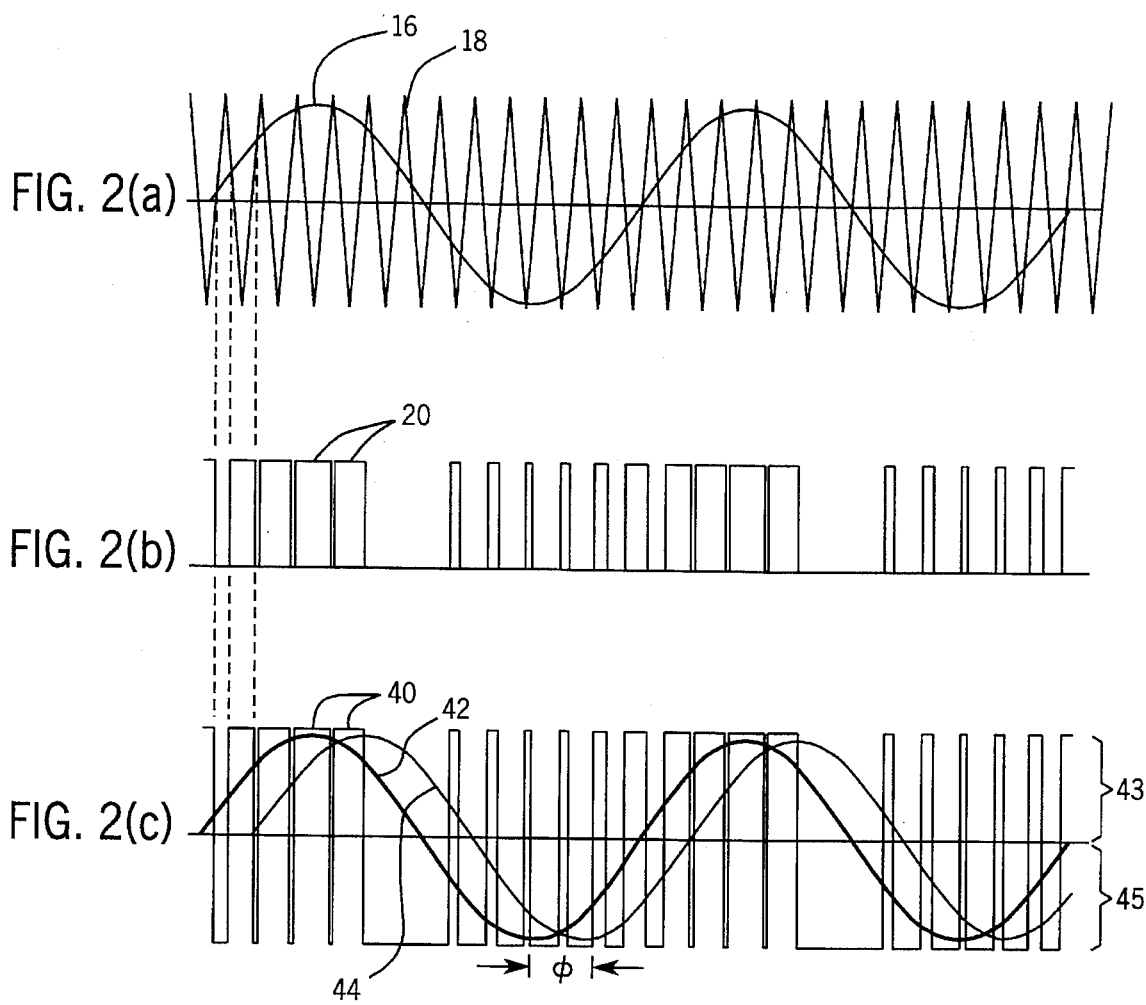

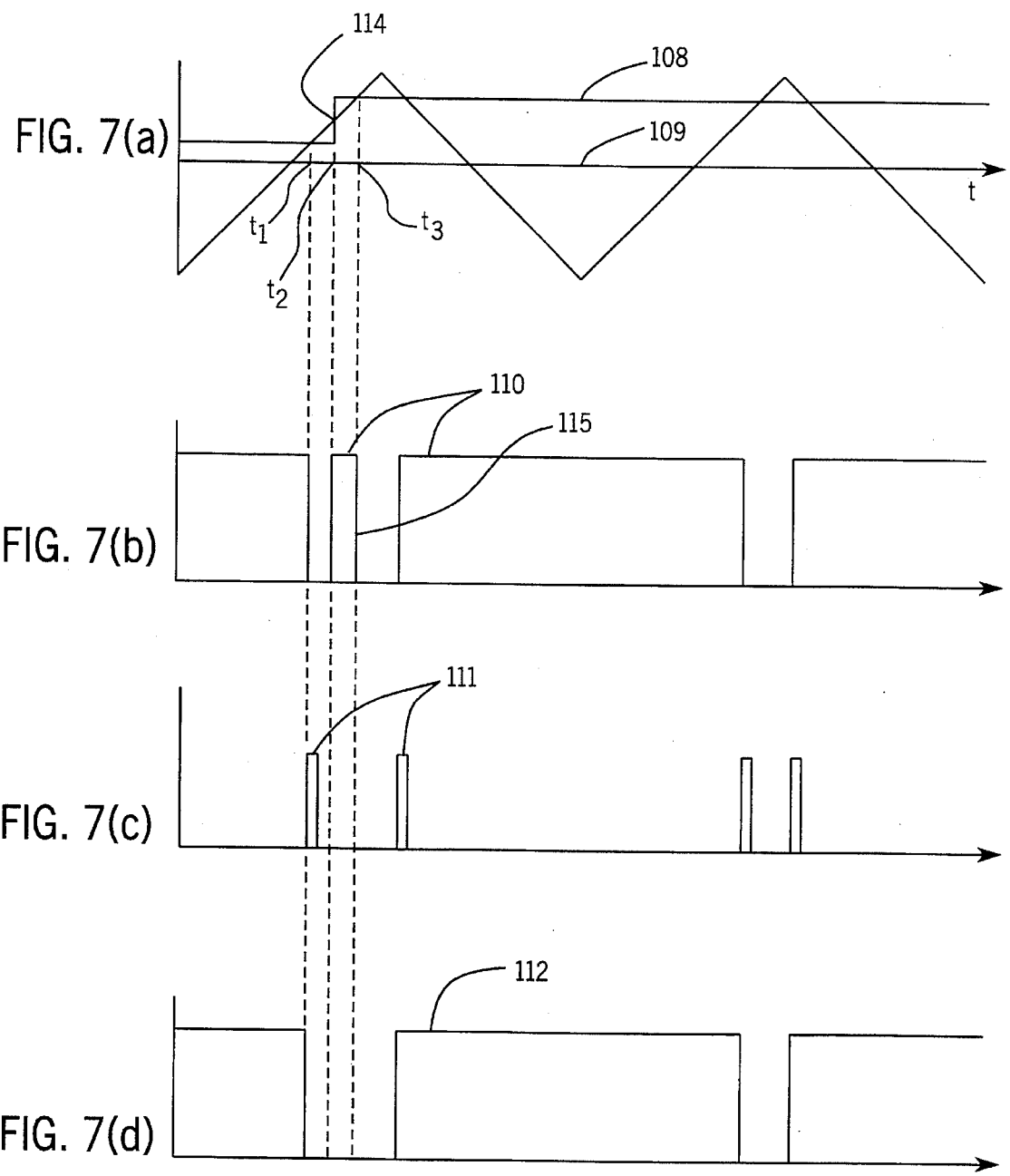

APPARATUS USED WITH AN INVERTER/CONVERTER ELIMINATING UNINTENDED VOLTAGE PULSES

BACKGROUND

1. Field of the Invention

The present invention relates to AC motors. More particularly, the present invention relates to an apparatus to be used with a pulse width modulated (PWM) inverter driving an AC motor to eliminate unintended voltage pulses caused by discontinuities in a modulating command signal.

2. Description of the Art

Many motor applications require that the motor be driven at various speeds. Motor speed can be adjusted with an adjustable speed drive (ASD) and which is placed between a voltage source and an associated motor that can excite the motor at various frequencies.

One commonly used type of ASD uses a pulse width modulated (PWM) inverter and associated PWM controller which can control both voltage and frequency of signals that eventually reach the stator windings of a motor. Referring to FIGS. 2(a) and 2(b), a PWM controller receives both a modulating command signal 16 and a carrier signal 18, compares the command and carrier signals 16, 18 and produces a firing signal 20. When the command signal 16 is greater than the carrier signal 18, the firing signal 20 is high. When the command signal 16 is less than the carrier signal 18, the firing signal 20 is low.

The firing signal 20 is used to control an associated PWM inverter. The inverter produces a series of high frequency voltage pulses that excite the stator windings of a motor. Referring also to FIG. 2(c), an exemplary sequence of high frequency pulses 40 that an inverter might provide to a motor can be observed along with an exemplary low frequency alternating voltage 42 and related alternating current 44. The high frequency pulses 40 are positive when the firing signal 20 is high and negative when the firing signal 20 is low.

By varying the widths of the positive portions 43 of each high frequency pulse relative to the widths of the negative portions 45 over a series of high frequency pulses 40, a changing average voltage 42 can be generated. To produce a sinusoidal average voltage 42, a simple sinusoidal modulating command signal 16 can be used.

The changing average voltage 42 defines the low frequency alternating voltage that drives the motor. The low frequency alternating voltage 42 in turn produces a low frequency alternating current 44 that lags the voltage by a phase angle $\phi$. As well known in the art, the motor operates at the frequency of the alternating current 44.

By changing the frequency of the sinusoidal command signal 16, the frequency of the alternating current 44, and thus the motor speed, can be altered. For example, by increasing the frequency of the command signal 16, the frequency of the alternating current can be increased and motor speed can in turn be increased. Motor speed can be decreased by decreasing the sinusoidal command signal 16 frequency. In addition, by changing the peak-to-peak amplitude variation of the command signal 16 while maintaining a constant frequency, the amplitude of the stator winding current can be altered.

In theory, a PWM inverter can be used to drive a motor accurately at various motor speeds. In reality, however, due to controller-inverter system noise and unforseen command signal discontinuities, often the alternating voltage commnad produces excessive switching of the power devices.

To correct for errors in motor current, many PWM controllers include a feedback loop which compares actual motor current to desired motor current and increases or decreases the command signal 16 in order to compensate for current errors. While a properly designed feedback loop can correct for noise and signal discontinuities, often an abruptly corrected command signal can introduce greater error than it eliminates.

Referring to FIGS. 3(a) and 3(b), a corrected command signal 16' and a carrier signal 18' along with a resulting firing signal 20' can be observed. Prior to $t_1$, the command signal 16' is greater than the carrier signal 18' and the firing signal 20' is appropriately high. At $t_1$, the command signal 16' crosses the carrier signal 18' and the firing signal 20' goes appropriately low.

At $t_2$, the amplitude of the command signal 16' is increased 46 to correct for a deviation between the desired and actual stator winding currents. When corrected, the command signal 16' becomes greater than the carrier signal 18' and the firing pulse 20' goes high. The firing pulse 20' remains high until the command signal 16' again crosses the carrier signal 18' at $t_3$. At $t_4$ the command signal 16' again goes above the carrier signal and the firing signal 20' goes high.

The command signal correction 46 at $t_2$ results in a command signal discontinuity at $t_2$ and a "double crossing" between the carrier and command signals 18', 16' first at $t_1$ and then at $t_3$. The double crossing in turn produces an additional and unintended firing pulse 22. Referring also to FIG. 3(c), the unintended firing pulse creates an unintended additional high frequency pulse 47 which ultimately increases the switching losses Beside feedback, double crossings can be caused by command signal discontinuities and generally by system noise. Together, noise, signal discontinuities, and feedback corrections can produce enough double crossings to produce imprecise motor operation to a degree which is intolerable for many motor applications.

One way to eliminate the effects of double crossings is to employ a low pass filter just prior to the comparator circuit. The low pass filter allows the feed back loop to correct the command signal but slopes the correction so that it takes place more gradually (i.e. the correction is sloped so as to be less steep than the carrier signal).

Unfortunately, low pass filter operation is sensitive to motor application, motor size, and the carrier frequency. Motor application and size affect the amount of noise in a system and thus can instantaneously affect the difference between carrier signal slope and the slope of a corrected command signal. Similarly, carrier frequency clearly affects the difference between carrier signal slope and the slope of a corrected command signal. Thus, a low pass filter designed to operate under one set of conditions cannot operate effectively in all applications to eliminate the effect of double crossing signals.

Thus, it would be advantageous to have a method or apparatus which could eliminate the effects of double crossing. Ideally, the method or apparatus should be independent of motor application and size and independent of carrier signal frequency.

SUMMARY OF THE INVENTION

The present invention is a method and apparatus used with a motor controller having a PWM inverter for eliminating discontinuities in a stator current that are caused by noise, command signal discontinuities, and feedback corrections. While noise, discontinuities, and corrections can cause unintended double crossings between a carrier signal and a command signal during any half cycle of a carrier signal, the present invention only allows a single crossing during any carrier signal half cycle to alter the applied voltage.

The method of the present invention is to be used with a motor controller for controlling a pulse width modulated inverter. The method is used for eliminating unintended pulses in a PWM output signal. The controller receives a carrier signal and produces a PWM output signal. The method comprises the steps of determining if the slope of the carrier signal is positive or negative, if the slope of the carrier signal is positive, permitting the output signal to change only from high to low, and if the slope of the carrier signal is negative permitting the output signal to change only from low to high.

Thus, one object of the present invention is to eliminate the possibility of more than one change in the state of the output signal during each half cycle of the carrier signal. If the output signal is only permitted to change from high to low when the slope of the carrier signal is positive, once the output signal goes low during a positive half cycle, it will remain low during the remainder of the existing positive half cycle. Similarly, if the output signal is only permitted to change from low to high when the slope of the carrier signal is negative, once the output signal goes high during a negative half cycle, it will remain high during the remainder of the existing negative half cycle.

Importantly, the output signal controls the high frequency voltage pulses provided to the motor. As only one high frequency voltage pulse is desired during each carrier signal cycle, by limiting the state changes of the output signal to once per half cycle, the intended number of high frequency voltage pulses can be produced.

In a preferred method the controller provides a PWM input signal and the method further includes the steps of determining if the PWM output signal is high or low, determining if the PWM input signal is high or low and the step of permitting the PWM output signal to change from high to low includes the step of, if the PWM output signal is high, and the PWM input signal is low, forcing the PWM output signal to go low, and the step of permitting the PWM output signal to change from low to high includes the step of, if the PWM output signal is low, and the PWM input signal is high, forcing the PWM output signal to go high.

Also, preferably, the controller also receives a command signal and the method further includes the step of producing the PWM input signal prior to determining if the PWM input signal is high or low, the PWM input signal being high when the command signal is greater than the carrier signal and low when the command signal is less than the carrier signal.

The method may also include the step filtering the command signal prior to producing the PWM input signal to filter out high frequency signal components.

Yet another object of the present invention is to add a level of redundancy to the correction method. A low pass filter can dampen any instantaneous large changes in the slope of the command signal so that multiple crossings occur less often.

Preferably, a carrier signal generator provides a slope signal that is high when the carrier signal has a positive slope and is low when the carrier signal has a negative slope and the step of determining the slope of the carrier signal includes the step of receiving the slope signal.

The method may further include the steps of filtering the slope signal to produce a synchronized slope signal and replacing the slope signal with the synchronized slope signal.

Thus, another object of the invention is to make an accurate carrier signal slope determination which is noise independent. Without a filter, the slope signal might be instantaneously negative at some time during a positive half cycle and instantaneously positive at some time during a negative cycle. Clearly such deviations would limit the effectiveness of the present invention as a double crossing that occurs during an instantaneous slope signal deviation could produce unintended voltage pulses at the stator windings. The filter eliminates high frequency disturbances from the slope signal and thus is a true representation of which half cycle, positive or negative, presently exits.

In another preferred method the controller also receives a PWM input signal and the steps of permitting the PWM output signal to change include the steps of determining if the PWM output signal is high or low, if the carrier signal slope is positive and the PWM output signal is low or if the carrier signal slope is negative and the PWM output signal is high, maintaining the present PWM output signal and under any other circumstances, equating the PWM output signal to the PWM input signal.

The present invention includes a method to be used with a motor controller to control a pulse width modulated inverter, the method for eliminating unintended pulses in a PWM output signal, the controller receiving a command signal and a carrier signal and producing a PWM input signal that is high when the command signal is greater than the carrier signal and is low when the command signal is less than the carrier signal, the controller also producing a PWM output signal, the method comprising the steps of determining if the slope of the carrier signal is positive or negative, determining if the PWM output signal is high or low, determining if the PWM input signal is high or low, if the carrier signal slope is positive, the PWM output signal is high, and the PWM input signal is low, allowing the PWM output signal to go low, if the carrier signal slope is negative, the PWM output signal is low, and the PWM input signal is high, allowing the PWM output signal to go high, and under any other circumstances, maintaining the present PWM output signal.

The present invention also includes an apparatus to be used with a motor controller to control a pulse width modulated inverter for eliminating unintended pulses in a PWM output signal. The apparatus receives a carrier signal and produces a PWM output signal and comprises a comparator to determine if the slope of the carrier signal is positive or negative, and a lockout circuit that, if the slope of the carrier signal is positive, permits the output signal to change only from high to low and, if the slope of the carrier signal is negative, permits the output signal to change only from low to high.

Preferably, the controller also receives a command signal and produces a PWM input signal that is high when the command signal is greater than the carrier signal and is low when the command signal is less than the carrier signal, the apparatus further comprising an output module to determine if the PWM output signal is high or low, an input module to determine if the PWM input signal is high or low and, the lockout circuit includes a command corrector that, if the PWM output signal is high, and the PWM input signal is low, forces the PWM output signal to go low, and, if the PWM output signal is low, and the PWM input signal is high, forces the PWM output signal to go high.

The invention further includes an apparatus to be used with a motor controller to control a pulse width modulated inverter for eliminating excess PWM pulses in a PWM output signal. The controller receives a command signal and a carrier signal and produces a PWM input signal that is high when the command signal is greater than the carrier signal and is low when the command signal is less than the carrier signal. The controller also provides a slope signal that is high when the slope of the carrier signal is positive and is low when the slope of the carrier signal is negative. The apparatus receives both the PWM input signal and the slope signal and produces a PWM output signal. The apparatus comprises an inverter module that receives the PWM input signal, PWM output signal, and slope signal and produces an inverted input signal, an inverted output signal and an inverted slope signal, a first summing module that receives the inverted input signal, the slope signal and, the PWM output signal and produces a first sum signal that is high when all of the signals received by the first summing module are high and is low under any other condition, a second summing module that receives the PWM input signal, the inverted slope signal, and the inverted output signal and produces a second sum signal that is high when all of the signals received by the first summing module are high and is low under any other condition, a tally module that receives both the first and second sum signals and produces a tally signal that is low if both of the sum signals is low and is high under any other circumstances, and a switching mechanism that receives the PWM input signal and the tally signal and produces the PWM output signal, the switching mechanism being enabled when the tally signal is high and disabled when the tally signal is low, the PWM output signal imitating the PWM input signal when the switching mechanism is enabled and remaining unchanged when the switching mechanism is disabled.

Other and further objects and aspects of the present invention will become apparent during the course of the following description and by reference by the accompanying drawings.

BRIEF DESCRIPTION OF THE DRAWINGS

FIG. 2(a) is a graph illustrating carrier and command signals, FIG. 2(b) is a graph illustrating resultant firing pulses, and FIG. 2(c) is a graph illustrating the high frequency pulses generated by a PWM inverter, the resulting low frequency alternating voltage applied to, and an associated alternating current provided to, a stator winding by a PWM inverter;

FIG. 7(a) is a graph illustrating a command signal and a carrier signal, FIG. 7(b) is a graph illustrating a PWM input signal, FIG. 7(c) is a graph illustrating an enable signal, and FIG. 7(d) is a graph illustrating a PWM output signal.

DETAILED DESCRIPTION OF THE PREFERRED EMBODIMENT

Figure 1:
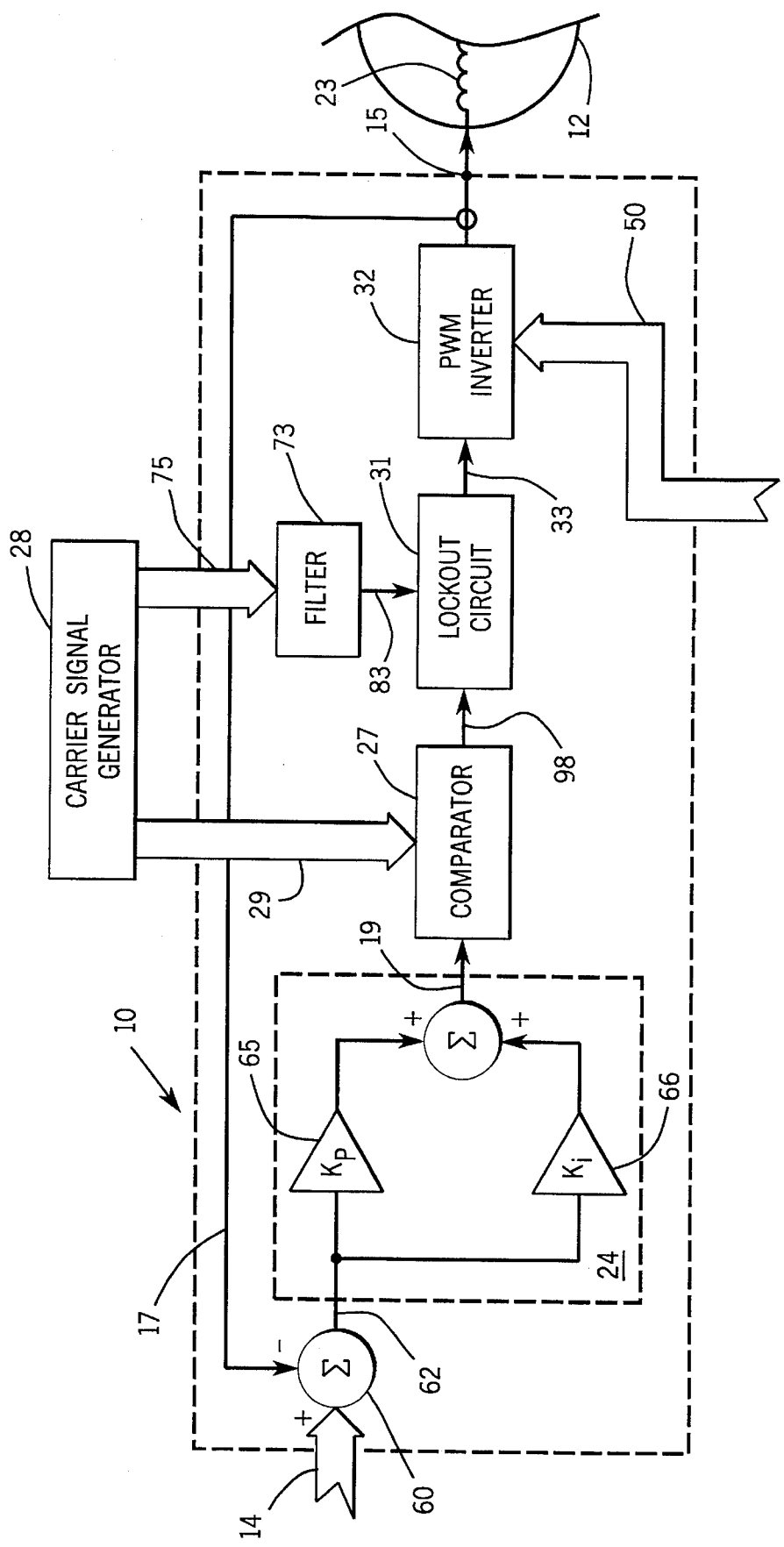
FIG. 1 is a schematic diagram of a motor control system including the lockout circuit of the present invention.

The present invention will be described in the context of the exemplary motor control system 10 and motor 12 shown in FIG. 1. To facilitate the understanding of the present invention, the present invention is described in relation to only a single phase of a three phase motor. It should be understood that all three phases of a three phase motor are individually controlled as described herein and that the present invention contemplates control of all three phases.

The control system 10 consists of a comparator 27, a lock out circuit 31, a PWM inverter 32, a feedback loop 17, and other components which will be discussed below. The control system 10 receives an initial command signal on line 14 indicating both the amplitude and frequency of a desired stator winding current and produces an actual current at stator winding terminal 15 which excites the motor stator winding The actual current delivered at node 15 often differs from the current prescribed by the initial command signal on line 14.

To compensate for any discrepancies between the actual and desired stator winding currents, the feedback loop 17 is provided which detects the actual current at terminal 15 and provides an actual current signal on loop 17 for comparison with the desired current signal on line 14. The actual current is then corrected using a PI controller 24 in a manner to be described below.

To produce the actual current at terminal 15, the PI controller 24 passes a corrected command signal to the comparator 27 on line 19. The comparator 27 also receives a carrier signal 29. Referring to FIG. 2(a), an exemplary command signal 16 and carrier signal 18 can be observed. The carrier signal 18 has a periodic sawtooth waveform while the command signal 16 is sinusoidal. The carrier signal 18 has a higher frequency than the command signal 16 so that the two signals intersect a plurality of times during one cycle of the command signal 16.

Referring also to FIG. 2(b), the comparator 27 compares the command signal 16 and carrier signal 18 and produces a firing signal, or PWM input signal 20. The PWM input signal 20 is high when the command signal 16 is greater than the carrier signal 18 and is low when the command signal 16 is less than the carrier signal 18.

Referring still to FIG. 1, the PWM input signal 20 is provided to the lockout circuit 31 on line 98. The lockout circuit 31 operates in the manner to be described below to eliminate the possibility of altering the state of the PWM input signal 20 more than once per each positive or negative half cycle of the carrier signal 18. The lockout circuit 31 produces a PWM output signal on firing line 33 that is connected to the PWM inverter 32.

Figure 4:
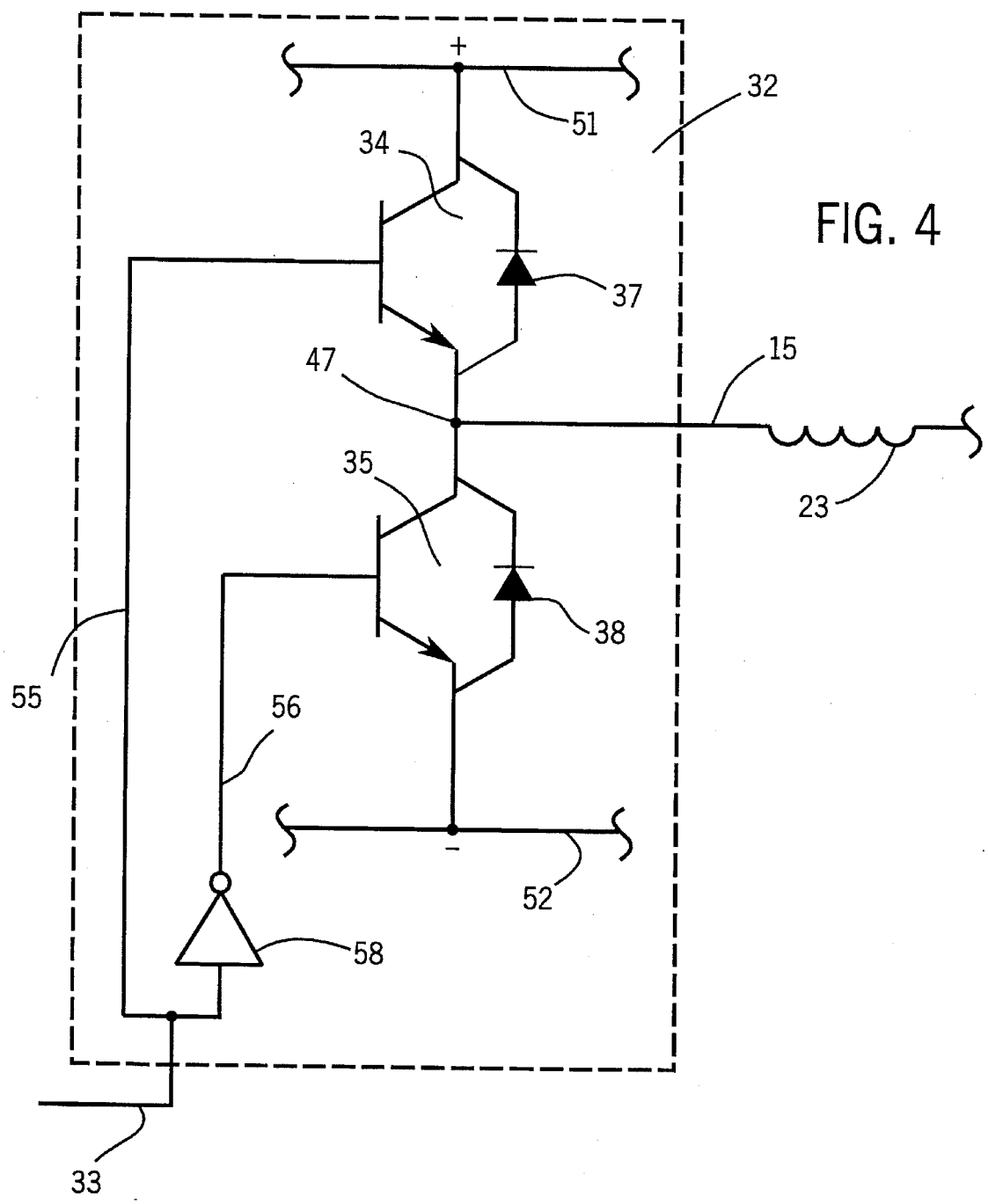
FIG. 4 is a circuit diagram illustrating switching devices which form an inverter.

Referring to FIG. 4, the inverter 32 consists of two solid state switching devices 34, 35 (BJT, GTO, IJBT or other transistor technology may be employed) associated with each stator winding 23. The two devices 34, 35 are arranged in series, each device 34, 35 being coupled by an inverse parallel connected diode 37, 38. The devices 34, 35 share a common node at stator winding terminal 15.

Referring also to FIG. 1, the PWM inverter 32 also receives a DC voltage on voltage bus 50 which produces both positive and negative DC voltage rails 51, 52. The switching devices 34, 35 connect the positive and negative rails 51, 52. Each device 34, 35 is also electrically connected to the firing line 33 by a separate switching line 55, 56. An inverter 58 is positioned in switch line 56 to alter the state of the firing signal from high to low or low to high so that the signal on line 55 is always opposite the signal on line 56.

During a high PWM output signal, switch 34 is on and switch 35 is off, thus connecting the terminal 15 to the high DC rail 51 and providing a positive voltage pulse at terminal 15. When the PWM output signal goes low, switch 34 goes off and switch 35 goes on connecting the terminal 15 to the low DC rail 52 and providing a negative voltage pulse at terminal 15. In this manner, the switching devices 34, 35 are turned on and off in a repetitive sequence that alternately connects the high and low voltage rails 51, 52 to, and produces a series of high frequency voltage pulses at, terminal 15. The high frequency voltage pulses average over a given period to produce a low frequency alternating voltage at terminal 15.

Referring to FIG. 2(c), an exemplary sequence of high frequency pulses 40 that an inverter 32 might provide to motor terminal 15 can be observed along with an exemplary low frequency alternating voltage 42. By varying the widths of the positive portions 43 of each high frequency pulse relative to the widths of the negative portions 45 over a series of pulses 40, a changing average voltage value which alternates sinusoidally can be generated. The changing average value defines the low frequency alternating voltage 42 that drives the motor 12.

The low frequency alternating voltage 42 produces a terminal current 44 that lags the low frequency alternating voltage 42 by phase angle φ. It is this terminal current 44 that is provided to terminal 15 and is detected by the feedback loop 17 for comparison to the desired current prescribed by the command signal on line 14.

A summing node 60 receives both the actual current signal and the initial command signal and subtracts the actual current signal from the initial command signal to produce an error signal on error line 62. The error signal is provided to the PI-controller 24, which consists of a proportional leg 65 and an integration leg 66. The two legs 65, 66 operate together to alter the initial command signal 14. The proportional leg 65 increases or decreases the command signal in proportion to the error signal. The integration leg 66 increase or decreases the command signal as a function of how fast the error signal is changing. Operation of the two legs 65, 66 is well known in the art. The PI controller 24 produces a corrected command signal on line 19.

Figure 3A:
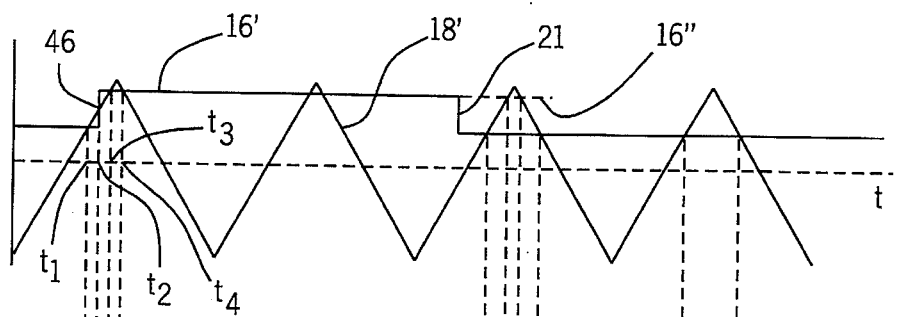
FIG. 3(a) is a graph illustrating a carrier signal and a corrected command signal.
Figure 3B:
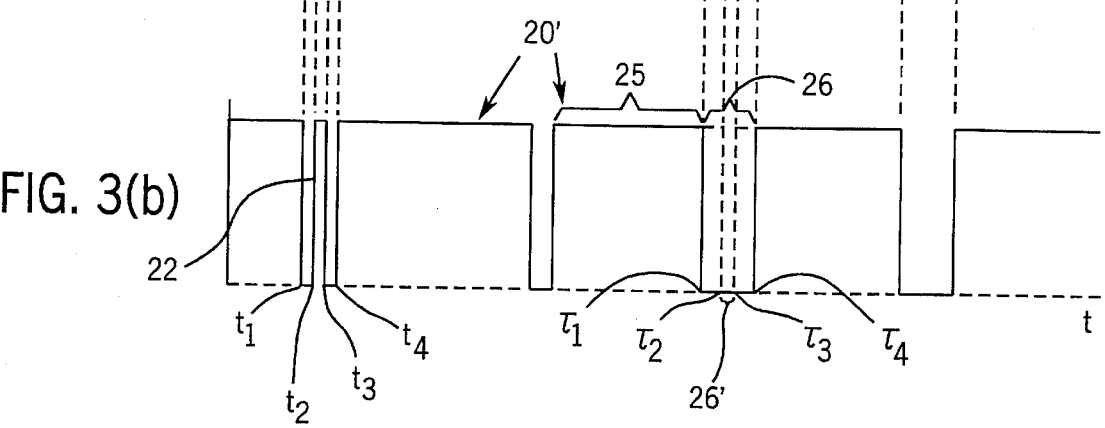
FIG. 3(b) is a graph illustrating a resulting firing signal.

By altering the command signal the PWM input signals, and ultimately the actual stator current, are altered. For example, referring to FIG. 3(a), a correction 21 is made to the command signal 16' which decreases the amplitude of the command signal 16'. Referring also to FIG. 3(b), because of the correction 21, the command signal 16' crosses carrier signal 18' at $\tau_1$ and $\tau_4$ producing a PWM input signal 20' having a low period 26 equal to $\tau_4-\tau_1$. If the correction 21 had not been made, an uncorrected command signal 16" would have intersected the carrier signal 18' at $\tau_2$ and $\tau_3$ producing a PWM input signal 20' having a relatively shorter low period 26' equal to $\tau_3-\tau_2$.

Figure 3C:
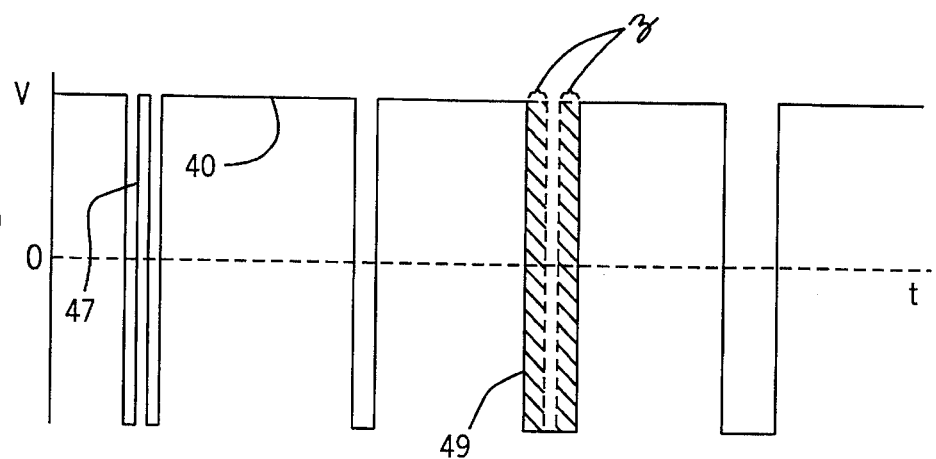
FIG. 3(c) is a graph illustrating resulting high frequency pulses produced by an inverter.

Referring also to FIG. 3(c), comparing the high frequency voltage pulses 40 that result from the corrected and uncorrected command signals 16', 16", the negative pulse 49 produced by the corrected command signal 16' is wider by 2ζ than the negative pulse that would have been produced by the uncorrected pulse 16". Referring again to FIG. 2(c), ultimately, changing the ratio of the widths of the positive to the negative portions of the high frequency voltage changes the low frequency alternating voltage 42 and resulting current 44.

While command signal corrections are supposed to correct for stator current errors, often a correction can introduce a greater error than it eliminates by increasing the effective switching frequency. Referring to FIGS. 3(a) and 3(b), prior to $t_1$ the command signal 16' is greater than the carrier signal 18' and thus the PWM input signal 20' is high. At $t_1$ the command signal 16' crosses the carrier signal 18' and thus the PWM input signal 20' goes low. At $t_2$, the feedback loop requires a command signal correction 46 increasing the amplitude of the command signal 16'. Such a correction 46 can produce a command signal 16' that is greater than the carrier signal 18' for a short period.

As the PWM input signal 20' goes high when the command signal 16' is greater than the carrier signal 18', the correction 46 produces an unintended high PWM input pulse 22. Referring also to FIG. 4(c), pulse 22 in turn produces an additional high frequency voltage pulse 47 which creates an error in the actual terminal current.

Referring to FIG. 1, the lock out circuit 31 eliminates the possibility of unintended high frequency current pulses by permitting the firing signal 70 to change states only once during a positive or negative half cycle of the carrier signal. A carrier signal generator 28 provides a differentiated carrier signal or slope signal on line 75. The slope signal is high when the carrier signal has a positive slope and low when the carrier signal has a negative slope.

Figure 5:
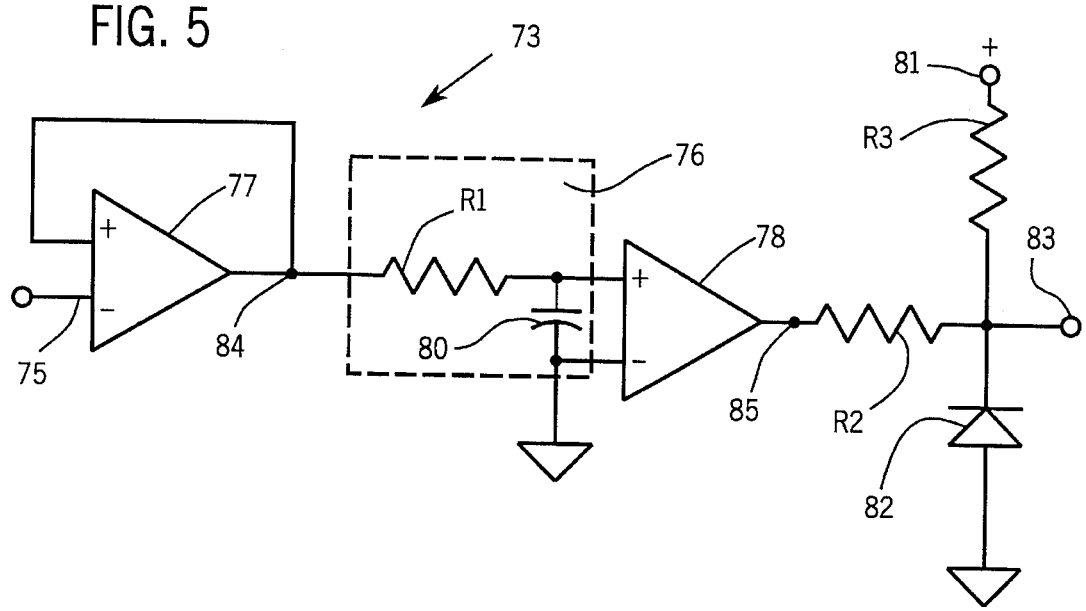
FIG. 5 is a diagram illustrating a filter circuit.

The slope signal is provided to a filter 73. Referring to FIG. 5, the filter 73 consists of 2 operational amplifiers 77, 78. The output of the first amplifier 77 is tied to the negative input of the first amplifier 77 to provide a unity gain voltage follower which stiffens the voltage as known in the art. The output of the first amplifier is also provided to an RC filter 76 consisting of a resistor R1 attached at one end to the output of the first amplifier 77 and a capacitor 80 attached to the other end of the resistor R1. The free end of the capacitor 80 is connected to ground. The capacitor 80 also connects the positive and negative inputs of the second amplifier 78 with the negative input of the second amplifier being attached to ground.

The output of the second amplifier 78 is provided to a second resistor R2 which shares a common node with a diode 82 and a third resistor R3. The free end of the third resistor R3 is electrically connected to a positive DC voltage source 81 while the free end of the diode 82 is grounded. Preferably, the positive DC voltage source is +5 volts.

In operation, the first amplifier 77 receives the slope signal 75, produces a stiffened signal at 84 which is provided to the RC filter 76. The capacitor 80 filters out high frequency signals caused by instantaneous slope deviations and produces a filtered signal at the positive input of the second amplifier 78. The second amplifier 78 receives the filtered signal and again stiffens the signal producing an analog filtered signal at 85. In the preferred embodiment, the resistors R1, R2, and R3 are chosen so that the analog filtered signal is either negative or positive and greater than 5 volts (i.e. greater than the voltage of the DC source 81). The analog filtered signal is a positive voltage when the carrier signal has a positive slope and is a negative voltage when the carrier signal has a negative slope.

When the analog filtered signal is positive at 85, the diode 82 is non-conducting and therefore, the voltage on line 83 is positive, or the equivalent of a digital ON signal. On the other hand, when the filtered signal is negative at 85, the diode is conducting and line 83 is connected to ground, thus being the equivalent of a digital OFF signal.

Thus, the filter 73 receives an analog signal at 75 indicating the slope of the carrier signal and produces a digital signal at 83 which is high during periods when the slope of the carrier signal is positive and is low during periods when the slope of the carrier signal is negative. The digital signal can easily be used for signal processing.

Importantly, in addition to producing a digital signal indicating the slope of the carrier signal, the filter 73 also eliminates instantaneous errors in the slope signal. System noise often distorts the carrier signal such that the slope signal might instantaneously be negative during a positive half cycle or might instantaneously be positive during a negative half cycle. The capacitor 80 eliminates instantaneous slope signal irregularities and produces a true slope signal at 85 from which the digital signal can be derived.

Referring again to FIG. 1, the filter 73 provides a filtered and synchronized slope signal to the lockout circuit 31 on line 83. The lockout circuit 31 also receives the PWM input signal on line 98.

Figure 6:
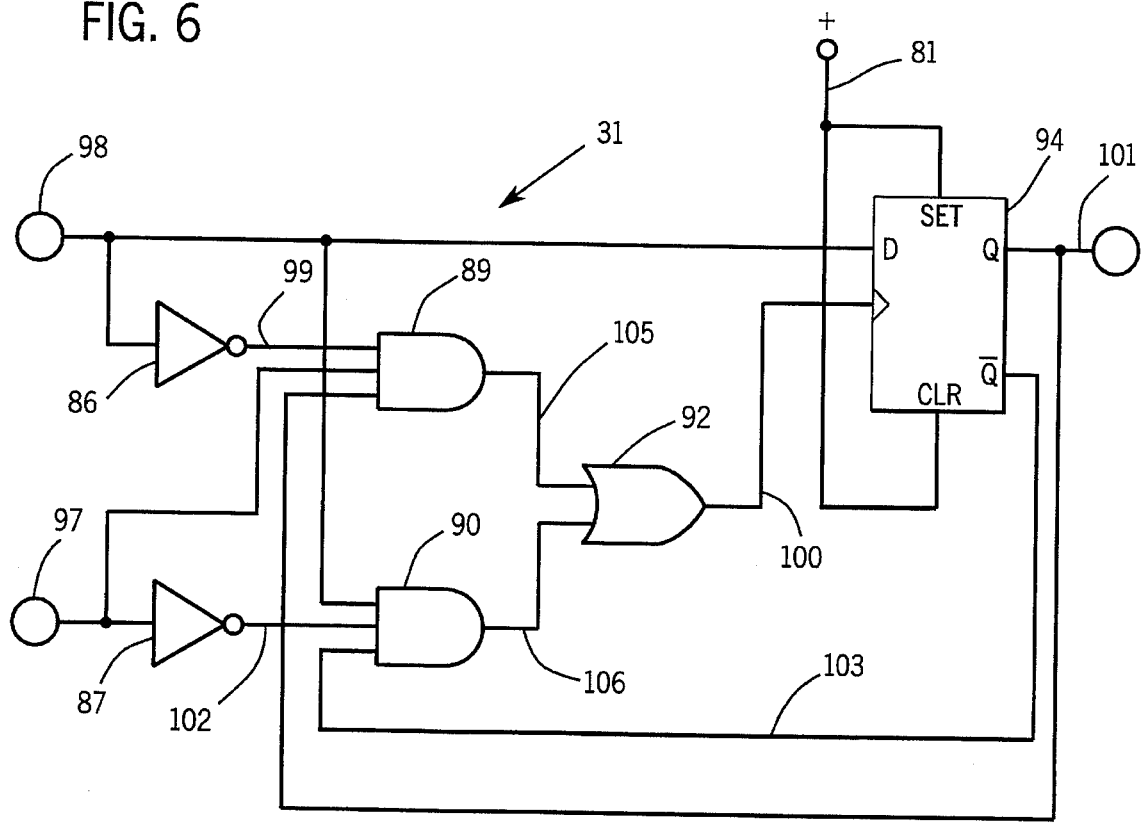
FIG. 6 is a schematic illustrating the lockout circuitry of the present invention.

Referring to FIG. 6, in the preferred embodiment the lockout circuit 31 consists of two inverters 86, 87, two AND gates 89, 90, a single OR gate 92, and a flip flop 94. The flip flop 94 receives the PWM input signal on line 98 and an enable signal on line 100. When the flip flop 94 is enabled, the PWM output signal on line 101 tracks the PWM input signal on line 98. The flip flop also produces an inverted PWM output signal on line 103.

Inverter 86 produces an inverted PWM input signal on line 99 and inverter 87 produces an inverted slope signal on line 102. The lock out circuit 31 provides a PWM output signal on line 101. The two AND gates 89, 90 and single OR gate 92 operate together to determine the state of the enable signal on line 100. The first AND gate receives the inverted PWM input signal on line 99, the synchronized supply signal from line 97, and the PWM output signal from line 94. The first AND gate 89 produces a high signal on line 105 only when all 3 signals received are high. Under all other circumstances, the first AND gate 89 produces a low signal.

The second AND gate 90 receives the PWM input signal from line 98, the inverted supply signal from line 102, and the inverted PWM output signal from line 103. The second AND gate 90 produces a high signal on line 106 only when all three signals received are high.

The OR gate 92 receives the signals from lines 105 and 106 and produces a high or enabling signal on line 100 when either the signal on line 105 or the signal on line 106 is high.

Thus, when the synchronized slope signal on line 83 is high indicating that the carrier signal slope is positive, the PWM output signal will change only if the PWM input signal is low and the PWM output signal is high. When the slope of the carrier signal is positive, the PWM output signal will only change from high to low, and will only change once during a given half cycle with a positive slope. In a like fashion, when the synchronized slope signal on line 83 is low indicating that the carrier signal slope is negative, the PWM output signal will change only once when the PWM input signal is high and the PWM output signal is low.

Referring now to FIGS. 7(a)–7(d), an exemplary command signal 108, carrier signal 109, PWM input signal 110, enable signal 111, and PWM output signal 112, can be observed and compared. In FIG. 7(a), prior to $t_1$, the command signal 108 is greater than the carrier signal 109, the resulting PWM input signal 110 is high, the enable signal 111 is off and the PWM output signal 112 is high. At $t_1$, the command signal 108 crosses and becomes less than the carrier signal 109 and the PWM input signal 110 goes low. Referring also to FIG. 6, as the slope of the carrier signal 109 is high, the PWM input signal 110 is low, and the PWM output signal is high, the AND gate 89 produces a high signal on line 105 which is passed through the OR gate 92 thus enabling flip flop 94. The enabled flip flop 94 allows the PWM output signal on line 101 to follow the PWM input signal on line 98 low as seen in FIG. 7(d).

After the PWM output signal 112 goes low, the output signal on line 101 is low and the AND gate 89 produces a low signal disabling the flip flop 94. At $t_2$, a command signal correction 114 takes place producing a command signal 108 that is greater than the carrier signal 109. The command signal 108 remains greater than the carrier signal 109 until $t_3$ and the resulting PWM input signal 110 has an unintended positive spike 115. However, because the flip-flop 94 is not enabled at $t_2$, the PWM output signal 112 does not follow the PWM input signal 110 and the unintended positive spike is eliminated.

Referring still to FIG. 7(c), the enable signal only goes high for a short time when the control signal 108 first crosses the carrier signal 109 during any given positive or negative half cycle. Thus, the PWM output signal can only follow the PWM input signal once during any given half cycle of the carrier signal 109 and the distorting effects of any double or multiple crossing can be avoided.

Although the present invention has been described above in the context of an apparatus, it should be understood that the present invention also contemplates a method to be used with a motor controller for controlling a pulse width modulated inverter. The method is used for eliminating unintended pulses in a PWM output signal wherein the controller receives a carrier signal and produces the PWM output signal. The method simply comprises the steps of determining if the slope of the carrier signal is positive or negative, if the slope of the carrier signal is positive, permitting the output signal to change only from high to low, and, if the slope of the carrier signal is negative permitting the output signal to change only from low to high.

As the method of the present invention is quite simple and most motor controllers include a central processing unit to control motor operation, the method of the present invention is particularly useful in that it could easily be implemented in software so that no additional hardware would be required.

It should also be understood that the methods and apparatuses described above are only exemplary and do not limit the scope of the invention, and that various modifications could be made by those skilled in the art that may fall under the scope of the invention. For example, other lockout circuits could be developed which effectively enable and disable the flip flop in a similar manner to produce a firing signal that changes only once during any given positive or negative half cycle of the carrier signal. In addition, a low pass filter could be included in FIG. 1 between the PI controller 24 and the comparator 27 to dampen any sudden command signal gains or decreases due to any error source. Such a low pass filter would eliminate many of the double crossings and operate, in many cases, as a redundant system to ensure that double crossings did not effect motor operation.

In order to appraise the public of the various embodiments that may fall within the scope of the invention, the following claims are made.

We claim:

1. A method for controlling a pulse width modulated inverter, the method for eliminating unintended pulses in a PWM output signal, the method comprising the steps of:

(a) a controller receiving a carrier signal and producing the PWM output signal;

(b) determining whether the slope of the carrier signal is positive or negative;

(c) permitting the output signal to change only from high to low when the slope of the carrier signal is positive; and (d) permitting the output signal to change only from low to high when the slope of the carrier signal is negative.

2. The method as recited in claim 1 wherein the controller provides a PWM input signal and the method further including the steps of determining if the PWM output signal is high or low, determining if the PWM input signal is high or low, and, the step of permitting the PWM output signal to change from high to low includes the step of, if the PWM output signal is high, and the PWM input signal is low, forcing the PWM output signal to go low, and the step of permitting the PWM output signal to change from low to high includes the step of, if the PWM output signal is low, and the PWM input signal is high, forcing the PWM output signal to go high.

3. The method as recited in claim 2 wherein the controller also receives a command signal and further including the step of producing the PWM input signal prior to determining if the PWM input signal is high or low, the PWM input signal being high when the command signal is greater than the carrier signal and low when the command signal is less than the carrier signal.

4. The method as recited in claim 3 further including the step of filtering the carrier signal prior to producing the PWM input signal to remove high frequency signals.

5. The method as recited in claim 1 wherein a carrier signal generator provides a slop signal that is high when the carrier signal has a positive slope and is low when the carrier signal has a negative slope and the step of determining the slope of the carrier signal includes the step of receiving the slope signal.

6. The method as recited in claim 5 further including the steps of filtering the slope signal to produce a synchronized slope signal and replacing the slope signal with the synchronized slope signal.

7. The method as recited in claim 1 wherein the controller also receives a PWM input signal and the steps of permitting the PWM output signal to change include the steps of:

(a) determining if the PWM output signal is high or low;

(b) if the carrier signal slope is positive and the PWM output signal is low or if the carrier signal slope is negative and the PWM output signal is high, maintaining the present PWM output signal; and (c) if the PWM output signal and carrier signal are other than specified in step (b), equating the PWM output signal to the PWM input signal.

8. A method for controlling a pulse width modulated inverter, the method for eliminating unintended pulses in a PWM output signal, the controller receiving a command signal and a carrier signal and producing a PWM input signal that is high when the command signal is greater than the carrier signal and is low when the command signal is less than the carrier signal, the controller also producing the PWM output signal, the method comprising the steps of:

(a) determining if the slope of the carrier signal is positive or negative;

(b) determining if the PWM output signal is high or low;

(c) determining if the PWM input signal is high or low;

(d) if the carrier signal slope is positive, the PWM output signal is high, and the PWM input signal is low, allowing the PWM output signal to go low;

(e) if the carrier signal slope is negative, the PWM output signal is low, and the PWM input signal is high, allowing the PWM output signal to go high; and (f) if the PWM output signal and carrier signal are other than specified in steps (d) or (e), maintaining the present PWM output signal.

9. The method as recited in claim 8 wherein a carrier signal generator provides a slope signal that is high when the carrier signal has a positive slope and is low when the carrier signal has a negative slope and the step of determining the slope of the carrier signal includes the step of receiving the slope signal.

10. An apparatus for controlling a pulse width modulated inverter, the apparatus used to eliminate excess PWM pulses in a PWM output signal, the apparatus receives a carrier signal and produces a PWM output signal, the apparatus comprises:

(a) a comparator to determine whether the slope of the carrier signal is positive or negative; and (b) a lockout circuit that permits the output signal to change only from high to low when the slope of the carrier signal is positive and, permits the output signal to change only from low to high when the slope of the carrier signal is negative.

11. The apparatus as recited in claim 10 wherein the controller also receives a command signal and produces a PWM input signal that is high when the command signal is greater than the carrier signal and is low when the command signal is less than the carrier signal, the apparatus further comprising, an output module to determine if the PWM output signal is high or low, an input module to determine if the PWM input signal is high or low, and, the lockout circuit includes a command corrector that, if the PWM output signal is high, and the PWM input signal is low, forces the PWM output signal to go low, and, if the PWM output signal is low, and the PWM input signal is high, forces the PWM output signal to go high.

12. The apparatus as recited in claim 10 wherein the lockout circuit also receives a PWM input signal and the lockout circuit includes:

(a) an output module to determine if the PWM output signal is high or low; and (c) a lockout module that, if the carrier signal slope is positive and the PWM output signal is low or if the carrier signal slope is negative and the PWM output signal is high, maintains the present PWM output signal, and, under any other circumstances, equates the PWM output signal to the PWM input signal.

13. An apparatus for controlling a pulse width modulated inverter, the apparatus used to eliminate excess pulses in a PWM output signal, the controller receives a command signal and a carrier signal and produces a PWM input signal that is high when the command signal is greater than the carrier signal and is low when the command signal is less than the carrier signal, the inverter also provides a slope signal that is high when the slope of the carrier signal is positive and is low when the slope of the carrier signal is negative, the apparatus receives both the PWM input signal and the slope signal and produces the PWM output signal, the apparatus comprises:

(a) an inverter module that receives the PWM input signal, PWM output signal, and slope signal and produces an inverted input signal, an inverted output signal and an inverted slope signal;

(b) a first summing module that receives the inverted input signal, the slope signal and, the PWM output signal and produces a first sum signal that is high when all of the signals received by the first summing module are high and is low under any other condition;

(c) a second summing module that receives the PWM input signal, the inverted slope signal, and the inverted output signal and produces a second sum signal that is high when all of the signals received by the first summing module are high and is low under any other condition;

(d) a tally module that receives both the first and second sum signals and produces a tally signal that is low if both of the sum signals is low and is high under any other circumstances; and (e) a switching mechanism that receives the PWM input signal and the tally signal and produces the PWM output signal, the switching mechanism being enabled when the tally signal is high and disabled when the tally signal is low, the PWM output signal imitating the PWM input signal when the switching mechanism is enabled and remaining unchanged when the switching mechanism is disabled.

14. The apparatus as recited in claim 13 wherein the summing modules are AND gates, the tally module is an OR gate, the switching mechanism is a flip-flop, and the inverter module includes three inverters that provide the inverted PWM input, inverted PWM output, and inverted slope signals.

* * * * *